United States Patent
Kanazawa et al.

[11] Patent Number: 6,037,695
[45] Date of Patent: *Mar. 14, 2000

[54] VEHICLE ALTERNATOR HAVING IMPROVED ROTATING YOKE

[75] Inventors: Hiroshi Kanazawa; Kazuo Tahara, both of Hitachi; Fumio Tajima, Juou-machi; Yoshiaki Honda, Hitachinaka; Hideaki Kamohara, Ami-machi, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,583

[22] Filed: Mar. 10, 1997

Related U.S. Application Data

[63] Continuation of application No. 08/409,078, Mar. 22, 1995, abandoned.

[30] Foreign Application Priority Data

Mar. 23, 1994 [JP] Japan ................................ 6-51451
Sep. 22, 1994 [JP] Japan ................................ 6-228304

[51] Int. Cl.[7] .................................................. H02K 1/22
[52] U.S. Cl. .............................. 310/263; 310/43; 310/51; 310/156; 310/271
[58] Field of Search ................................ 310/156, 263, 310/271

[56] References Cited

U.S. PATENT DOCUMENTS

| | | | |
|---|---|---|---|
| 3,968,390 | 7/1976 | Yasuda et al. | 310/156 |
| 4,617,485 | 10/1986 | Nakamura et al. | 310/65 |
| 4,959,577 | 9/1990 | Radomski | 310/263 |
| 5,038,066 | 8/1991 | Pawlak et al. | 310/263 |
| 5,132,581 | 7/1992 | Kusase | 310/263 |
| 5,177,391 | 1/1993 | Kusase | 310/263 |
| 5,306,977 | 4/1994 | Hayashi | 310/263 |
| 5,483,116 | 1/1996 | Kusase et al. | 310/263 |

FOREIGN PATENT DOCUMENTS

| | | |
|---|---|---|
| 54116610 | 9/1979 | Japan . |
| 61-85045 | 4/1986 | Japan . |
| 2159950 | 6/1990 | Japan . |
| 3251067 | 11/1991 | Japan . |
| 3265450 | 11/1991 | Japan . |
| 4251553 | 9/1992 | Japan . |
| 5207716 | 8/1993 | Japan . |

Primary Examiner—Elvin Enad
Attorney, Agent, or Firm—Antonelli, Terry, Stout & Kraus, LLP

[57] ABSTRACT

An alternator for a vehicle, including a rotating yoke composed of a pair of hook-shaped magnetic poles arranged in facing relation to each other and being concentrically attached to a shaft, a magnetic-field winding for generating a magnetizing force in the hook-shaped magnetic poles, stator magnetic poles arranged in the periphery of the rotating yoke, magnets for decreasing leakage magnetic flux arranged between the hook portions of the hook-shaped magnetic poles, and protection covers arranged in the positions of the outer surface of the magnets fixed to the side surfaces of the hook portions between the hook portions such that the outer surface does not become higher than the outer periphery of the hook portion.

6 Claims, 9 Drawing Sheets

VEHICLE ALTERNATOR HAVING IMPROVED ROTATING YOKE

This application is a Continuation of application Ser. No. 08/409,078, filed Mar. 22, 1995 now abandoned.

BACKGROUND OF THE INVENTION

The present invention relates to a vehicle alternator having hook-shaped magnetic poles, and more particularly, the invention relates to an alternator for a vehicle in which leakage magnetic flux between the hook portions of the hook-shaped magnetic poles of the alternator is decreased by magnets.

In general, an alternator for a vehicle has a rotating yoke composed of a pair of hook-shaped magnetic poles arranged in facing relation to each other and forming a plurality of hook portions having N-poles and S-poles in the top ends thereof, magnetic-field windings to generate a magnetizing force in the hook-shaped poles wound inside the rotating yoke, and stator magnetic poles arranged in spaced relationship to form a certain gap with the rotating yoke. The magnetic flux put out from the hook portion of the hook-shaped magnetic pole of a N-pole returns to the hook portion of the hook-shaped magnetic pole of a S-pole through the stator magnetic pole to form a magnetic circuit. A stator winding is wound in the stator magnetic pole to generate an inductive electromotive force in the stator winding by intersecting the magnetic flux of the magnetic circuit with the stator winding, which forms an alternating generator.

In the alternator having such a construction, the magnetic flux intersecting with the stator winding produces the generated voltage according to the effective magnetic flux. However, there is some magnetic flux which is put out from the hook portion of the hook-shaped magnetic pole, but does not enter into the stator magnetic pole due to leakage. In order to improve the efficiency of generation, it is necessary to decrease the leakage magnetic flux.

In a conventional alternator for a vehicle, various ways of decreasing leakage magnetic flux between hook portions of hook-shaped magnetic poles are described in (1) Japanese Patent Application Laid-Open No. 54-116610 (1979), (2) Japanese Patent Application Laid-Open No. 61-85045 (1986), (3) Japanese Patent Application Laid-Open No. 3-251067 (1991), (4) Japanese Patent Application Laid-Open No. 2-159950 (1990).

The above-referenced publication (1) calls for an adhesive containing a hard magnetic material to be filled between the hook portions of hook-shaped magnetic poles; the above-referenced publications (2) and (3) call for magnets to be arranged between the hook portions of hook-shaped magnetic poles, and the above-referenced publication (4) calls for magnets to be arranged on the outer peripheral surface of the hook portions of hook-shaped magnetic poles.

The arranging of magnets between the hook portions of hook-shaped magnetic poles to prevent the magnet from fracturing and scattering due to centrifugal force during high speed rotation is described in (5) Japanese Patent Application Laid-Open No. 4-251553 (1992), (6) Japanese Patent Application Laid-Open No. 3-265450 (1990) and (7) Japanese Patent Application Laid-Open No. 5-207716 (1993).

The above-referenced publication (5) calls for a non-magnetic material member, such as metal tension tape, to be arranged cylindrically in the outer periphery of the magnets and the hook portions of hook-shaped magnetic poles; and the above-referenced publication (6) and (7) calls for a non-magnetic material ring having projections and depressions in the radial direction attachable to the end surfaces and the peripheral surfaces of the hook portions of the hook-shaped magnetic poles to be arranged in the outer periphery of the magnets in such a way as to be even with the outer peripheral surface of the hook portions of the hook-shaped magnetic poles.

However, these proposals have the following disadvantages.

There arises a problem in that the fillers of the adhesive containing hard magnetic material in the case of the above referenced publication (1) and the magnets in the cases of the above conventional technologies (2) to (4) are fractured and scattered due to centrifugal force during high speed rotation.

In the proposals described the above referenced publications (5) to (7), the above problem can be solved by arranging a bursting-out protector, such as metal tension tape or a non-magnetic material ring, in the outer periphery of the magnets. However, in the conventional technology (5), there arises a problem in that the magnetic resistance between the hook portion of the hook-shaped magnetic pole and the stator magnetic pole is increased so that the effective magnetic flux decreases, and consequently the efficiency of generation decreases since the gap between the hook portion of the hook-shaped magnetic pole and the stator magnetic pole increases by the thickness of the bursting-out protector.

In the proposals described in the above-referenced publications (6) and (7), there arises a problem in that the effective magnetic flux decreases as the leakage magnetic flux decreases so that small size magnets cannot help to be used, and consequently the efficiency of generation decreases since the magnets are arranged in a non-magnetic material ring having bumps and dips.

Further, in the proposals described in the above-referenced publications (5) to (7), there arises a problem in that the hook portions of the hook-shaped magnetic poles are lifted up due to centrifugal force during high speed rotation.

SUMMARY OF THE INVENTION

An object of the present invention is to provide an alternator for a vehicle, which alternator is durable under high speed rotation and high in generating efficiency.

In order to attain the above object, an alternator for a vehicle in a first concept according to the present invention employs the following construction.

That is, an alternator for a vehicle comprises a rotating yoke composed of hook-shaped magnetic poles, including N-poles and S-poles, arranged in facing to each other and being rotatably attached to a shaft to form a one-piece structure, a magnetic-field winding for generating a magnetizing force in said hook-shaped magnetic poles wound inside said rotating yoke, stator magnetic poles arranged around the periphery of said rotating yoke in spaced relationship with a certain gap therebetween, which further comprises magnets for decreasing leakage magnetic flux arranged between the hook portions of said hook-shaped magnetic poles, a protection cover for preventing said magnets from bursting out and for preventing the hook portions of said hook-shaped magnetic poles from lifting up, which protection cover is welded and fixed to the side surfaces of the hook portions between said hook portions in such a way that the outer surface is not higher than the outer periphery of a hook portion.

In a specific case, said protection cover is a belt-shaped sheet arranged continuously in a zigzag manner between the hook portions of said hook-shaped magnetic poles.

Further, said protection cover may be formed of segment-shaped members arranged in only the positions of the side surface of the hook portions between the hook portions of said hook-shaped magnetic poles.

In this case, for example, said magnets may be arranged at every other position between the hook portions of said hook-shaped magnetic poles.

In order to attain the above object, an alternator for a vehicle in a second concept according to the present invention employs the following construction. That is, an alternator for a vehicle comprises a rotating yoke composed of hook-shaped magnetic poles, including N-poles and S-poles, arranged in facing relation to each other and being rotatably attached to a shaft to form a one-piece structure, a magnetic-field winding for generating a magnetizing force in said hook-shaped magnetic poles wound inside said rotating yoke, stator magnetic poles arranged around the periphery of said rotating yoke in spaced relation with a certain gap therebetween, which further comprises magnets for decreasing leakage magnetic flux arranged between the hooks of said hook-shaped magnetic poles on at least one end side at both ends of said rotating yoke, and protection covers for preventing bursting out of the magnets arranged in the positions of the outer surface side of said magnets and of the same one end side of said rotating yoke.

In a specific case, said protection cover is a cylindrical continuous member arranged on the outer periphery of said magnets and the hook portions of said hook-shaped magnetic poles.

Further, said protection cover may be a segment-shaped member welded so as to be jointed to the side surface of the hook portions between the hook portions of said hook-shaped magnetic poles in such a way that the outer surface of the protection cover is not higher than the outer periphery of a hook portion.

In this case, for example, said magnets are arranged in the positions of both end sides of said rotating yoke and between the hook portions of said hook-shaped magnetic poles; and said protection covers are arranged in the positions of both end sides of said rotating yoke, respectively, and of the outer surface side of said magnets.

Further, said magnets may be arranged in the positions of both end sides of said rotating yoke and alternately between the hook portions of said hook-shaped magnetic poles, and said protection covers may be arranged in positions of both end sides of said rotating yoke, respectively, and of the outer surface side of said magnets.

Furthermore, said magnets may be arranged in the positions of one end side of said rotating yoke and between the hook portions of said hook-shaped magnetic poles, and said protection cover may be arranged in the positions of the same one end side of said rotating yoke and of the outer surface side of said magnets.

In the alternator for a vehicle according to any one of the first concept and the second concept, the material of said protection cover may be a non-magnetic material.

In the alternator for a vehicle according to any one of the first concept and the second concept, the material of said protection cover may be a magnetic material.

In order to attain the above object, an alternator for a vehicle in a third concept according to the present invention employs the following construction. That is, an alternator for a vehicle comprising a rotating yoke composed of hook-shaped magnetic poles, including N-poles and S-poles, arranged in facing relation to each other and being rotatably attached to a shaft to form a one-piece structure, a magnetic-field winding for generating a magnetizing force in said hook-shaped magnetic poles wound inside said rotating yoke, stator magnetic poles arranged around the periphery of said rotating yoke in spaced relation with a certain gap, which further comprises magnets for decreasing leakage magnetic flux arranged between the hook portion of said hook-shaped magnetic pole and said magnetic-field winding.

In an alternator according to any one of the first concept to the third concept, an antiferromagnetic material body may be provided instead of said magnet.

In an alternator according to any one of the first concept to the third concept, a superconductor body may be provided instead of said magnet.

In an alternator having the above construction in the first concept according to the present invention, the magnets arranged in the positions between the hook portions of the hook-shaped magnetic poles decrease the leakage magnetic flux between the hook portions of the hook-shaped magnetic poles, and consequently the efficiency of generation is increased.

Further, since the magnets generate a magnetomotive force in the hook-shaped magnetic pole as magnetomotive force sources in addition to the magnetic-field winding to increase the total amount of magnetic flux, the efficiency of generation is also increased.

In an alternator of such type, by arranging a protection cover in the outer surface of the magnets and by fixing and welding the protection cover to the side surface of the magnetic poles between the hook portions of the hook-shaped magnetic poles, fracturing and bursting-out of the magnets due to centrifugal force is prevented as well as lifting-up of the hook portions of the hook-shaped magnetic poles, and the durability during high speed rotation due to centrifugal force is improved.

Further, by making the outer surface of the protection cover not become higher than the outer periphery of said hook portion, the gap between the hook portion of the hook-shaped magnetic pole and the stator magnetic pole can be kept small and, therefore, any increase in the magnetic resistance between the hook portion of the hook-shaped magnetic pole and the stator magnetic pole can be suppressed with a decreasing of the leakage magnetic flux between the hook portions of the hook-shaped magnetic poles. Thereby, it is possible to obtain an alternator having a high durability against high speed rotation as well as having a high generating efficiency.

In an alternator having the above construction in the second concept according to the present invention, the magnets arranged between the hooks of the hook-shaped magnetic poles on at least one end side of both ends of said rotating yoke have the same operation to improve the generation efficiency as the above first concept. In the alternator of such type, by arranging the magnets between the hooks of the hook-shaped magnetic poles on at least one end side of both ends of said rotating yoke, the magnetic resistance between the hook portion of the hook-shaped magnetic pole and the stator magnetic pole can be suppressed and, thereby, it is possible to attain a higher generation efficiency since the magnets are arranged not in the middle position between the hook portions of the hook-shaped magnetic poles and, consequently, there is no need to place the protection cover in the middle portion, with the result that the gap between the hook portion of the hook-shaped magnetic pole and the stator magnetic pole is not increased. Further, by arranging the magnets between the hooks of said hook-shaped magnetic poles on at least one end side of both ends of said rotating yoke, fracturing and bursting-out of the magnets due to centrifugal force is prevented and the durability during high speed rotation due to centrifugal force is improved.

In an alternator having the above construction in the third concept according to the present invention, the magnets arranged between the hooks of the hook-shaped magnetic poles and the magnetic-field winding have the same operation to improve the generation efficiency as the above first concept. In the alternator of such type, by arranging the magnets between the hooks of the hook-shaped magnetic poles and the magnetic-field winding, the magnetic resistance passing through the effective magnetic flux is equivalently decreased since the magnetic path under the hook portion is eliminated and the area of the magnetic path is decreased, and there is no need to place the protection cover in the position between the hook portions of the hook-shaped magnetic poles since the magnets are not arranged in the position between the hook portions of the hook-shaped magnetic poles. Therefore, the gap between the hook portion of he hook-shaped magnetic pole and the stator magnetic pole is not increased, and the magnetic resistance between the hook portion of the hook-shaped magnetic pole and the stator magnetic pole can be suppressed and, thereby, it is possible to attain a higher generation efficiency. Further, fracturing and bursting-out of the magnets due to centrifugal force is prevented and the durability during high speed rotation due to centrifugal force is improved.

DETAILED DESCRIPTION OF THE PREFERRED EMBODIMENTS

The present invention will be described in detail below, referring to the accompanying drawings.

Figure 4:
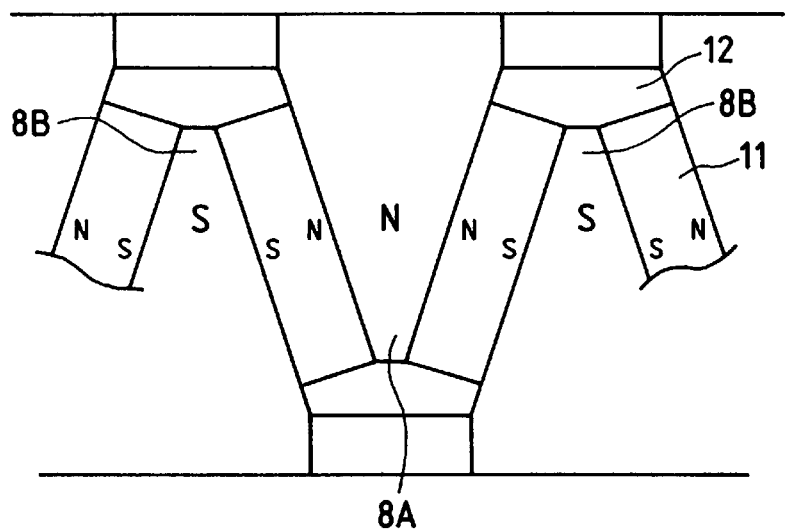
FIG. 4 is a diagrammatic bottom view showing the protection cover provided in the rotating yoke shown in FIG. 2.
Figure 5:
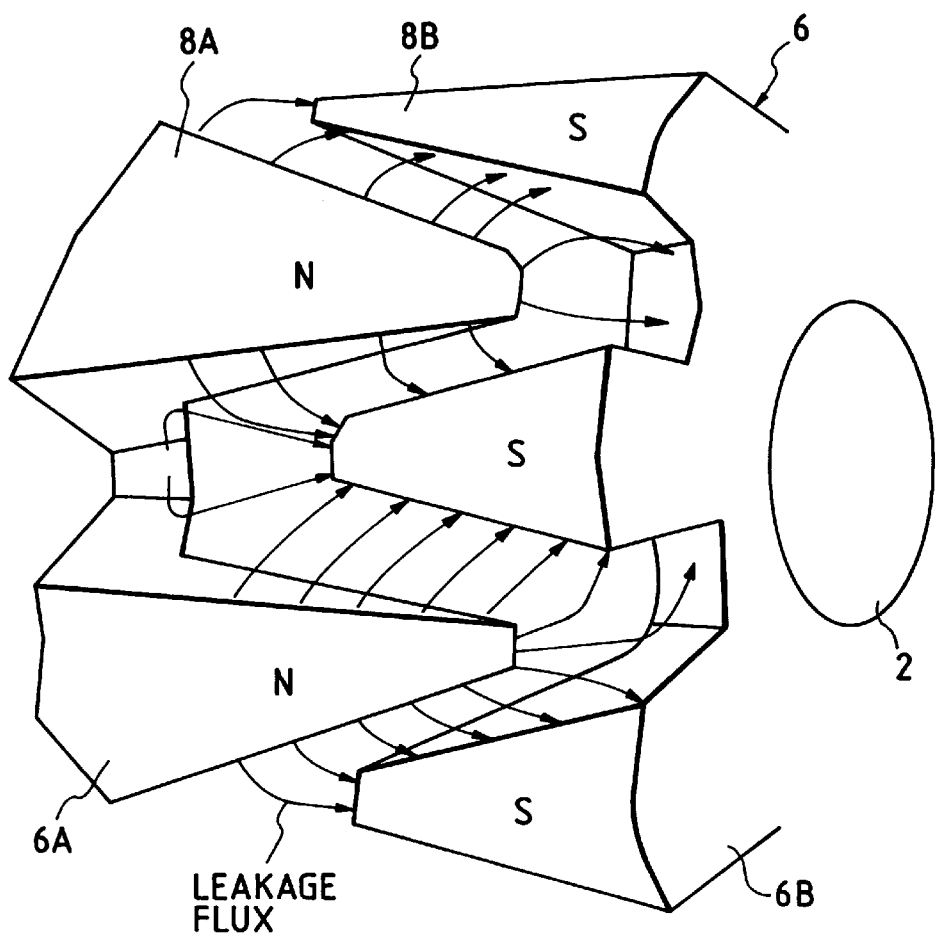
FIG. 5 is a perspective view of hook-shaped magnetic poles showing the feature of leakage magnetic flux in a case where a magnet is not placed between the hook portions of the hook-shaped magnetic poles.

A first embodiment according to the present invention will be described to FIG. 1, to FIG. 4.

Figure 1:
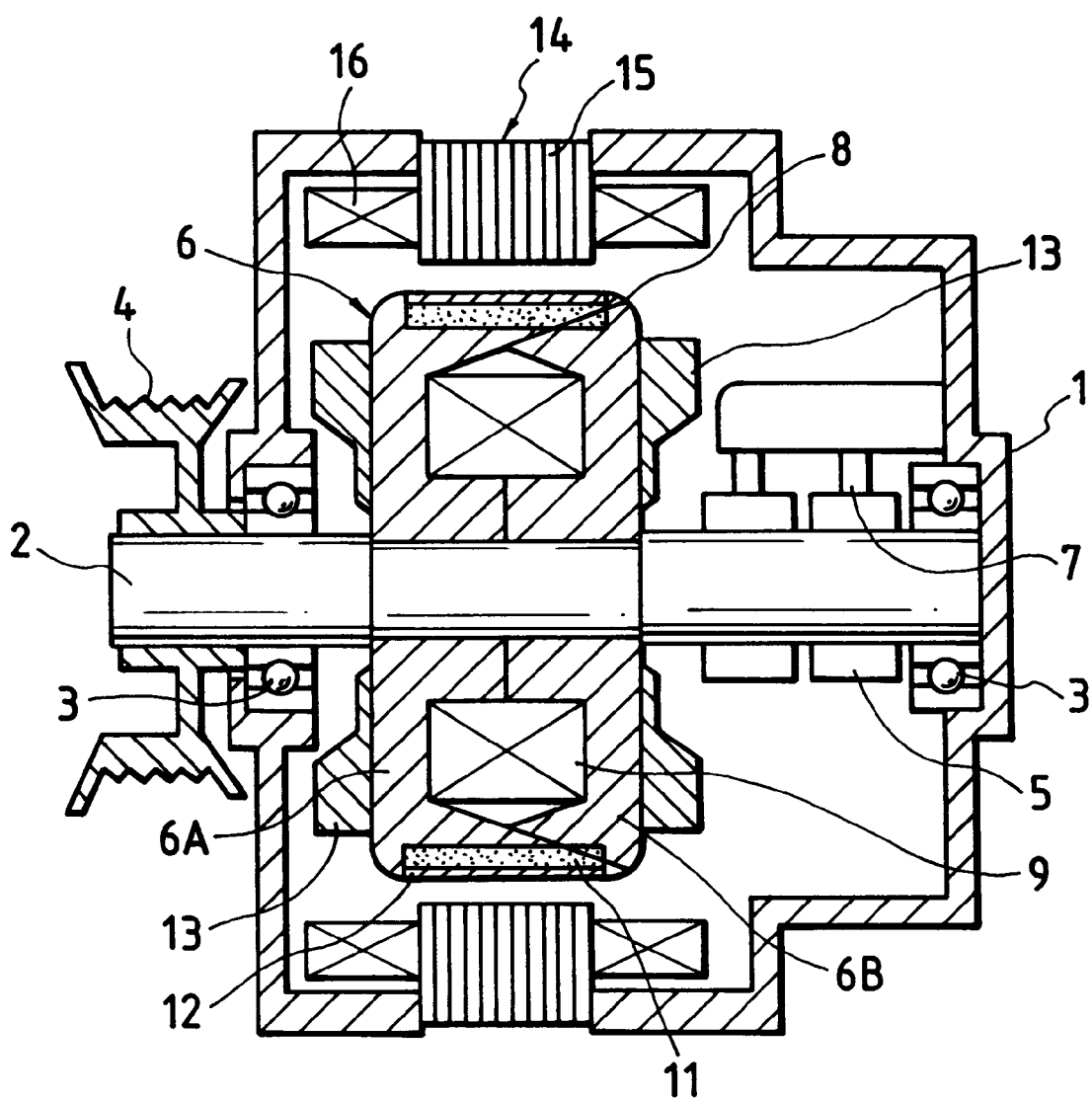
FIG. 1 is a partly cross-sectional vertical view showing a first embodiment of an alternator for vehicle in accordance with the present invention.

In FIG. 1, the first embodiment of an alternator has a housing 1, and a shaft 2 is supported in the central portion of the housing 1 through bearings 3. A pulley 4 outside the housing 1, slip rings 5 and a rotating yoke 6 inside the housing 1 are attached to the shaft 2 for rotation as a one-piece structure. The pulley 4 is connected to an output shaft of an engine through a belt, which is not shown in the figure, so as to be rotated in proportion to the rotating speed of the engine. The slip rings 5 are electrically connected to brushes 7 to supply direct current to a magnetic field winding 9 provided inside the rotating yoke 9 through the brushes 7. A cooling fan 13 is attached to the side portion of the rotating yoke 6. The rotating yoke 6 is formed of a pair of hook-shaped magnetic poles 6A, 6B facing each other as shown in FIG. 1, and the hook-shaped magnetic poles 6A, 6B are formed to have hook portions 8A, 8B (both are collectively called hook portions 8) having a plurality of N-poles and S-poles in the end portions. Inside the rotating yoke 6, the magnetic field winding 9 is wound with the shaft 2 as the center in the direction of the shaft to generate a magnetizing force in the hook-shaped magnetic poles 6A, 6B by conducting direct current from the slip rings 5.

Figure 2:
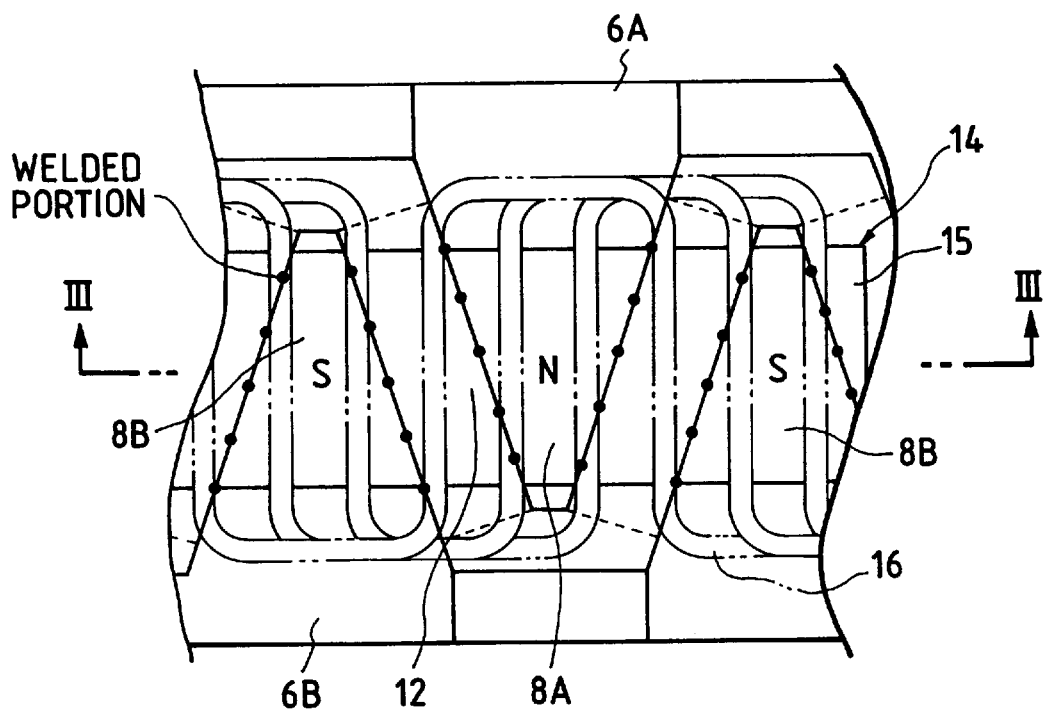
FIG. 2 is a diagrammatic top view showing the rotating yoke in the alternator shown in FIG. 1.
Figure 3:
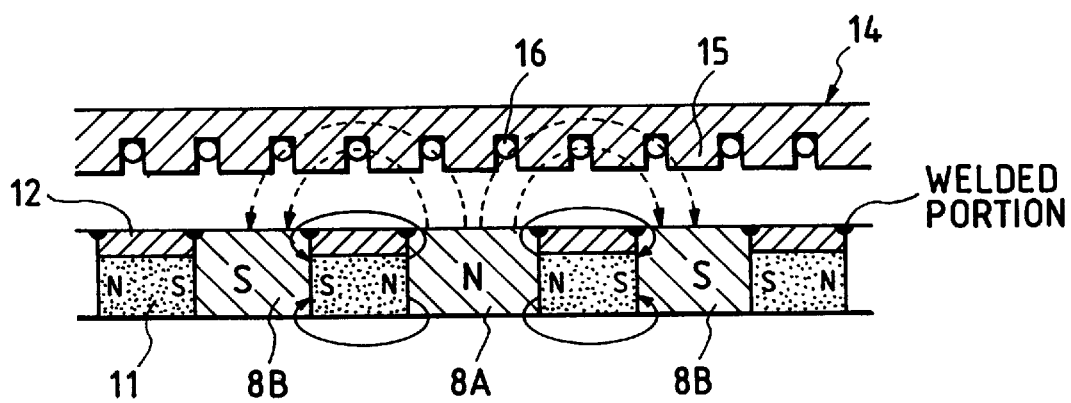
FIG. 3 is a cross-sectional view taken on the line III—III of FIG. 2.

As shown in FIG. 2 and FIG. 3, magnets 11 are arranged in positions between the hook portions 8 (between the hook portion 8A and the hook portion 8B) of the different hook-shaped magnetic poles 6A, 6B in such a way that the polarity of each magnet 11 becomes the same as the polarity of the adjacent hook portion 8, and a protection cover 12 is arranged on the outer surface side of the magnets. The protection cover 12 is a belt-shaped sheet arranged continuously in a zigzag between the hook portions 8 of the hook-shaped magnetic poles 6A, 6B, as shown in FIG. 2, the magnets 11 are fixed to the protection cover with adhesive or screws, and the protection cover is spot-welded and fixed to the side surface of the magnetic poles between the hook portions 8 of the hook-shaped magnetic poles 6A, 6B in such a way that the outer surface of the protection cover 12 becomes even with the outer peripheral surface of the hook portions 8. The magnets 11 used are common magnets, but they may be formed of a material containing rubber or plastic. The material, for the protection cover 12 may be non-magnetic material such as stainless steel, aluminum, titanium and so on.

In the middle of the housing 1, a stator 14 is provided, the stator 14 is attached in spaced relationship to form a certain gap with the rotating yoke 6, a plurality of stator magnetic poles 15 forming projections and depressions are arranged in the stator 14, and a stator winding 16 is wound in the depressed portion in a s wave-shape.

The operation of the embodiment of the alternator will be described below.

As the pulley 4 rotates, the shaft 2 is rotated together with the rotating yoke 6 and the slip rings 5. As direct current is conducted to the magnetic field winding 9 through the brushes 7, the magnetic field winding 9 generates an N-pole and an S-pole alternatingly in the hook-shaped magnetic poles 6A, 6B of the rotating yoke 6. As for the magnetic flux generated by the magnetic field winding 9, the magnetic flux put out from the N-pole hook portion 8A of the hook-shaped magnetic pole 6A returns to S-pole hook portion 8B of the hook-shaped magnetic pole 6B through the stator magnetic pole 15 to form a magnetic circuit. By intersecting the magnetic flux of the magnetic circuit with the stator winding 16, inductive electromotive force is generated in the stator winding 16 to form an alternating generator. If the current in the magnetic field winding 9 is constant, the inductive electromotive force generates a voltage proportional to the rotating speed of the rotating yoke 6. If the rotating speed is kept constant and the current flowing through the magnetic field winding 9 is increased or decreased, the output voltage can be changed. However, in general, the output voltage is kept to nearly a constant value of 14V in the outlet of a rectifier (which is not shown in the figure) by controlling the current flowing through the magnetic field winding 9 corresponding to the rotating speed of the engine and the load current.

In the operation described above, the magnetic flux intersecting with the stator winding 16 is the magnetic flux which produces the generating voltage. However, among the magnetic flux lines put out from the N-pole hook portion 8A of the hook-shaped magnetic pole 6A, there are some magnetic flux lines which return to the S-pole hook portion 8B of the hook-shaped magnetic pole 6B of without passing through the stator magnetic pole 15. If the gap between the hook portions 8 of the hook-shaped magnetic poles 6A, 6B and the stator magnetic pole 15 is large, the magnetic resistance between the hook portions 8 and the stator magnetic pole 15 is increased and the effective magnetic flux is decreased, which decreases the generating efficiency.

Therefore, magnets 11 are arranged between the hook portions 8 adjacent to the different hook-shaped magnetic poles 6A, 6B so that the effective magnetic flux is increased and the magnetic flux put out from the hook portion 8A of the hook-shaped magnetic pole 6A effectively enters into the stator magnetic pole 15. Thereby, as shown in FIG. 3, the magnetic flux of the magnet 11 arranged between the hook portions 8 of the hook-shaped magnetic poles 6A, 6B exits from the N-pole and enters into the S-pole, as indicated by solid lines. And, the flux put out from the N-pole hook portion 8A of the hook-shaped magnetic pole enters into the S-pole hook portion 8B of the hook-shaped magnetic pole 6B, as indicated by dotted lines, and consequently, as a result, the leakage magnetic flux between the hook portions 8 of the hook-shaped magnetic poles 6A, 6B is decreased and the generating efficiency is increased. In addition to this, the magnet 11 generates a magnetomotive force in the hook-shaped magnetic poles 6A, 6B as an additional source of magnetomotive force other than that of the magnetic field winding 9 to increase the total amount of magnetic flux, which also increases the generating efficiency.

The protection cover 12 is arranged between the hook portions 8 of the hook-shaped magnetic poles 6A, 6B in such a way that the outer surface of the protection cover 12 becomes even with the outer peripheral surface of the hook portions 8 of the hook-shaped magnetic poles 6A, 6B, and the gap between the hook portions 8 of the hook-shaped magnetic poles 6A, 6B and the stator magnetic pole 15 is kept small. Thereby, the magnetic resistance between the hook portions 8 of the hook-shaped magnetic poles 6A, 6B is prevented from increasing and the magnet 11 is prevented from fracturing and scattering due to centrifugal force during high speed rotation. In addition to these features, by providing the protection cover 12, there are an effect to decrease windage loss of the rotating yoke 6 and an effect to prevent the hook portions 8 of the hook-shaped magnetic poles 6A, 6B from lifting-up due to centrifugal force.

As described above, according to this first embodiment, the leakage magnetic flux between the hook portions 8 of the hook-shaped magnetic poles 6A, 6B is decreased and the total amount of the magnetic flux is increased, the magnetic resistance between the hook portions 8 of the hook-shaped magnetic poles 6A, 6B is prevented from increasing, and the windage loss of the rotating yoke 6 is decreased. Thereby, a higher generating efficiency can be attained. Further, fracturing and bursting-out of the magnets 11 due to centrifugal force is prevented and lifting-up of the hook portions 8 of the hook-shaped magnetic poles 6A, 6B is prevented, and the durability during high speed rotation due to centrifugal force is improved.

Figure 6:
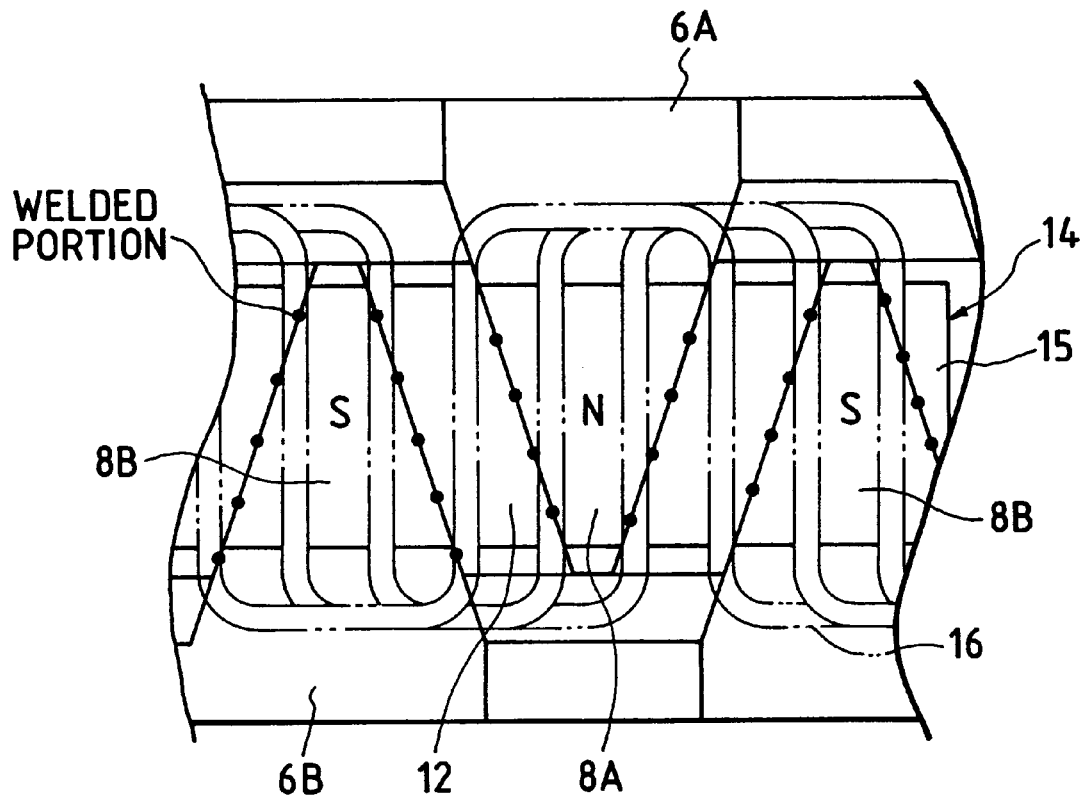
FIG. 6 is a diagrammatic top view of the rotating yoke in a modified alternator forming a first embodiment in accordance with the present invention.
Figure 7:
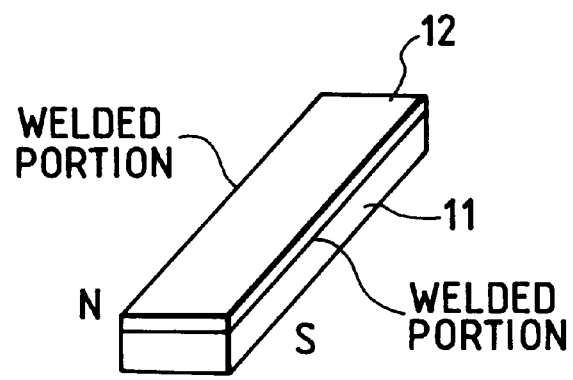
FIG. 7 is a perspective view of the protection cover provided in the rotating yoke shown in FIG. 6.

A modification of the first embodiment is shown in FIG. 6 and FIG. 7. In this modified embodiment, a segment-shaped sheet, shown in FIG. 7, arranged only on the side surface of the hook portion between the hook portions 8 of the different hook-shaped magnetic poles 6A, 6B is used as the protection cover 12 instead of the belt-shaped sheet in the first embodiment, and the protection cover 12 is spot-welded and fixed to the side surface of the hook portion between the hook portions 8 of the different hook-shaped magnetic poles 6A, 6B in such a way that the outer surface of the protection cover 12 becomes even with the outer peripheral surface of the hook portions 8. This embodiment can attain the same effect as the first embodiment.

Figure 8:
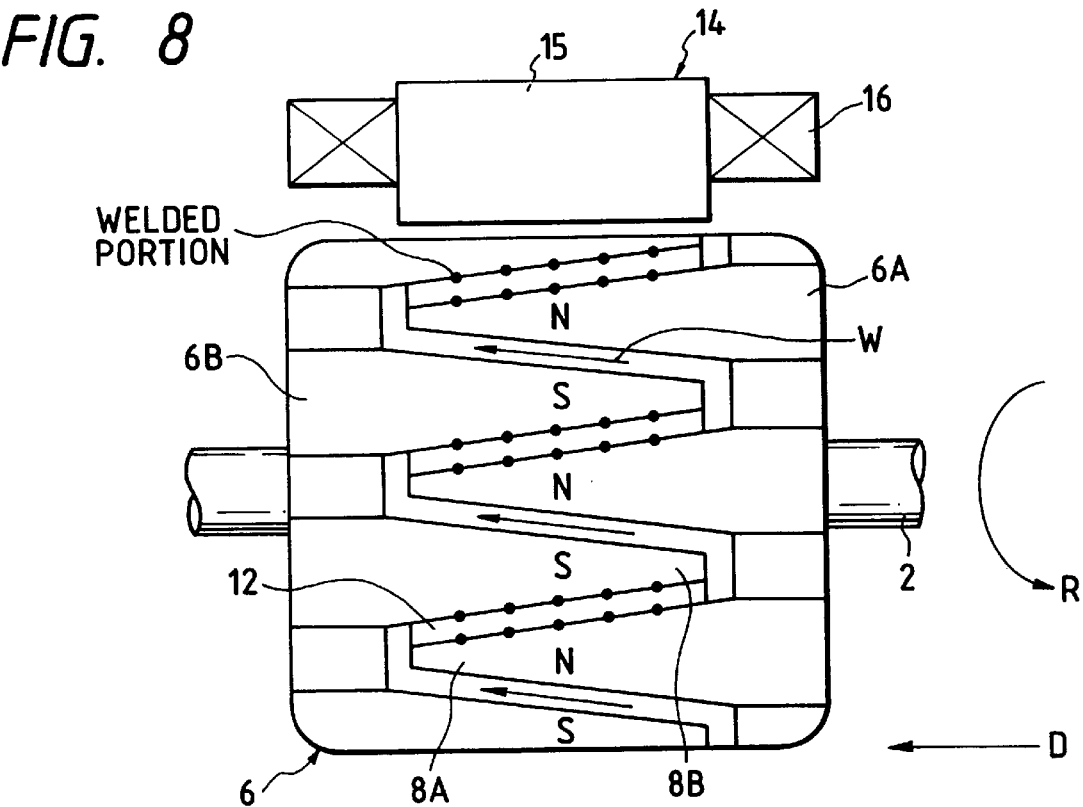
FIG. 8 is a front view showing a main part of another modified alternator representing the first embodiment in accordance with the present invention.

Another modification of the first embodiment is shown in FIG. 8. In this modified embodiment, the magnets 11 and the protection covers 12 are arranged at every other position between the hook portions 8 of said hook-shaped magnetic poles 6A, 6B in FIG. 6. Therein, let the flow direction of the wind generated by the cooling fan 13 (refer to FIG. 1) be the D-direction indicated in the figure, and the rotating direction of the rotating yoke 6 be the R-direction indicated in the figure. The magnets 11 and the protection covers 12 are arranged between the hook portions 8 of the hook-shaped magnetic poles 6A, 6B on the side where the wind flow is difficult, and the gap between the hook portions 8 in the side where the wind flow is easy is opened as the path for the wind flow.

This embodiment can attain the same effect as the first embodiment. In addition to this, in this embodiment, there is an effect in that the magnets 11 and the magnetic field winding 9 are cooled since wind flowing in the W-direction indicated in the figure is caused by of centrifugal fan forcing air between the hook portions 8 of the hook-shaped magnetic poles 6A, 6B where the magnets 11 and the protection covers 12 are not arranged. Therein, since the position between the hook portions 8 of the hook-shaped magnetic poles 6A, 6B, where the magnets 11 and the protection covers 12 are arranged, is selected as described above with the wind flow in the D-direction, a part of the wind flows between the hook portions 8 of the hook-shaped magnetic poles 6A, 6B where the magnets 11 and the protection covers 12 are not arranged to improve the above cooling effect further.

Although the protection cover 12 in the first embodiment is arranged between the hook portions 8 of the hook-shaped magnetic poles 6A, 6B in such a way that the outer surface of the protection cover 12 becomes even with the outer peripheral surface of the hook portions 8 of the hook-shaped magnetic poles 6A, 6B, the same effect can be attained even when the outer surface of the protection cover 12 is lower than the outer peripheral surface of the hook portions 8 of the hook-shaped magnetic poles 6A, 6B. The important point is that the outer surface of the protection cover 12 is not higher than the outer peripheral surface of the hook portions 8 of the hook-shaped magnetic poles 6A, 6B.

A second embodiment according to the present invention will be described with reference to FIG. 9 to FIG. 11. In these figures like parts as in FIG. 1 to FIG. 5 are identified by the same reference characters. And, as for the same constructions and operations as in the first embodiment description will be omitted.

Figure 9:
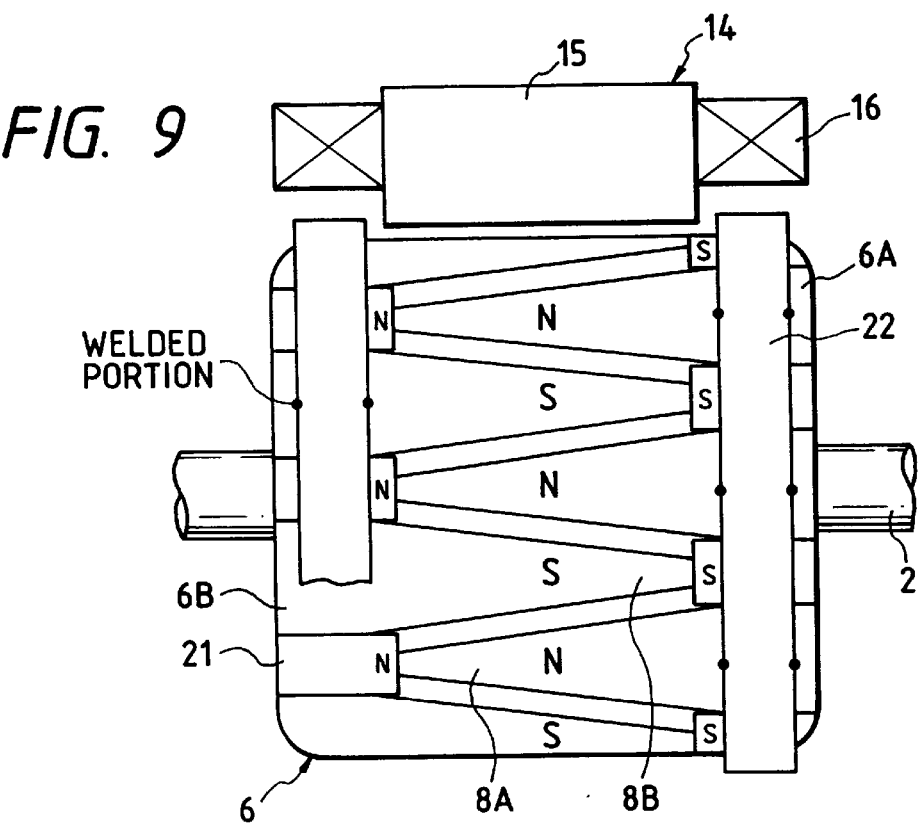
FIG. 9 is a front view showing a main part of a second embodiment of an alternator in accordance with the present invention.
Figure 10:
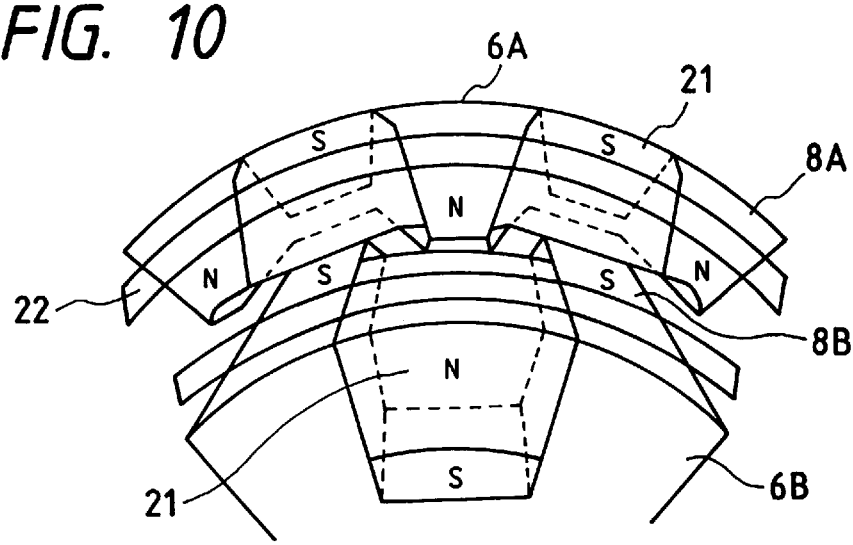
FIG. 10 is a partial perspective view showing the rotating yoke in the alternator shown in FIG. 9.

In the alternator in this embodiment, as shown in FIG. 9 and FIG. 10, a magnet 21 having a nearly cubic-shape is arranged in the position at both edge sides of the rotating yoke 6 and between the hook portions 8 of the identical hook-shaped magnetic pole 6A or 6B adjacent to each other (between the hook portions 8A adjacent to each other, or between the hook portions 8B adjacent to each other) in such a way that the magnet 21 touches the top end of the facing hook portion 8 (hook portion 8B, or hook portion 8A) of the hook-shaped magnetic pole 6B or 6A and has the same polarity as said facing hook portion. Protection covers 22 of cylindrical shape are arranged in the positions on both sides of the rotating yoke 6, and are spot-welded and fixed to the outer peripheries of the magnets 21 and the hook portions 8 of the hook-shaped magnetic poles 6A, 6B, individually. The material for the protection cover 22 is a magnetic material, such as iron or the like, or a non-magnetic material, such as stainless steel, aluminum, titanium or the like.

Figure 11:
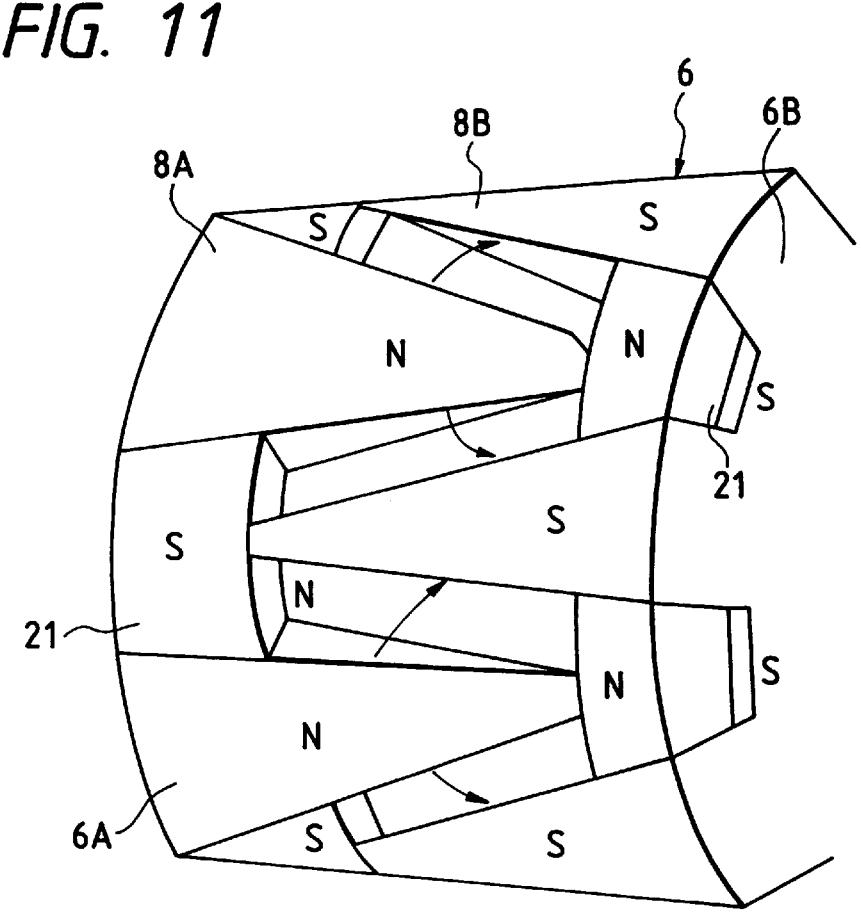
FIG. 11 is a perspective view of a hook-shaped magnetic pole showing the feature of decreasing leakage magnetic flux in a case where the magnets shown in FIG. 9 are arranged.

The magnets 21 arranged between the hook portions 8 of the identical hook-shaped magnetic poles 6A, 6B adjacent to each other at both of the edge portions of the rotating yoke 6 decrease the leakage magnetic flux near the edge portions of the hook portions 8 of the hook-shaped magnetic poles 6A, 6B, as shown in FIG. 11 to increase the generating efficiency. Further, since the magnets 21 generate a magnetomotive force in the hook-shaped magnetic pole 6A, 6B by acting as magnetomotive force sources in addition to the magnetic-field winding 9 to increase the total amount of magnetic flux, the efficiency of generation is further increased.

Since the magnets are not arranged in the middle position between the hook portions 8 of the hook-shaped magnetic poles 6A, 6B of the rotating yoke 6, there is no need to place the protection cover in the middle portion, and so the gap between the hook portions 8 of the hook-shaped magnetic poles 6A, 6B and the stator magnetic pole 15 is not increased; consequently, the magnetic resistance between the hook portions 8 of the hook-shaped magnetic poles 6A, 6B and the stator magnetic pole 15 can be prevented for increasing.

Since the protection covers 22 are arranged to have a cylindrical shape and are disposed at both edge sides of the rotating yoke 6 so as to cover the outer peripheries of the magnets 21 and the hook portions 8 of the hook-shaped magnetic poles 6A, 6B, individually, fracturing and bursting-out of the magnets 21 due to centrifugal force during high speed rotation can be prevented. Since the thickness dimension of the protection cover 22 is not restricted by the stator 14, the thickness of the protection cover can be increased more or less. Thereby, even if a material having a low mechanical strength, such as aluminum, is used, the mechanical strength of the protection cover can be maintained by an increase in its thickness. Further, the thickness may be utilized for balancing of the rotating yoke 6.

As described above, according to the second embodiment, the leakage magnetic flux between the hook portions 8 of the hook-shaped magnetic poles 6A, 6B is decreased and the total amount of the magnetic flux is increased, the magnetic resistance between the hook portions 8 of the hook-shaped magnetic poles 6A, 6B is prevented from increasing, and a higher generating efficiency can be attained. Fracturing and bursting-out of the magnet 21 due to centrifugal force is prevented, and the durability during high speed rotation is improved. Since a material having a low mechanical strength, such as aluminum, is used for the protection cover 22, it is easy to manufacture the alternator. Further, by making the thickness of the protection cover, the thick thickness may be utilized for balancing of the rotating yoke 6.

Figure 12:
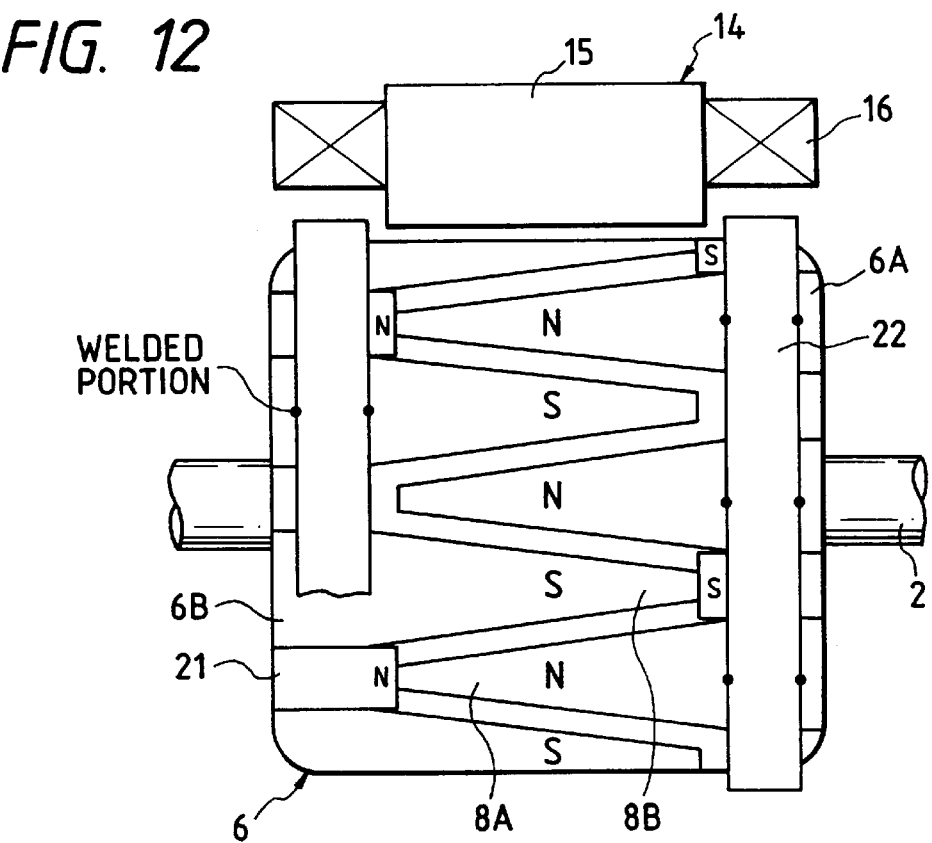
FIG. 12 is a front view showing a main part of a modified alternator forming a second embodiment in accordance with the present invention.

FIG. 12 shows a modification of the second embodiment. In the second embodiment, the magnet 21 is arranged at both edge sides of the rotating yoke 6 and between the hook portions 8 of the identical hook-shaped magnetic pole 6A or 6B adjacent to each other, and the protection covers 22 are arranged on both edge sides of the rotating yoke 6 so as to cover the outer peripheries of the magnets 21 and the hook portions 8 of the hook-shaped magnetic poles 6A, 6B, individually. However, in this modified embodiment, the magnets 21 are arranged on both edge sides of the rotating yoke 6, but are alternately disposed between the hook portions 8 of the identical hook-shaped magnetic pole 6A or 6B adjacent to each other, and the protection covers 22 are arranged on both edge sides of the rotating yoke 6 so as to cover the outer peripheries of the magnets 21 and the hook portions 8 of the hook-shaped magnetic poles 6A, 6B, individually.

Further, although not shown in the figure, it is possible that the magnets 21 may be arranged on only one end side of the rotating yoke 6 and between the hook portions 8 of the hook-shaped magnetic poles 6A, 6B, and the protection cover 22 may be arranged on the same one end side of the rotating yoke 6 so as to cover the outer surface of the magnets 21 and the hook portions 8 of the hook-shaped magnetic poles 6A, 6B. In this modified embodiment, the same effect as in the second embodiment can be attained.

In the case where the magnet 21 is arranged alternatively on both sides of the rotating yoke, the wind flow path is kept between the hook portions 8 of the hook-shaped magnetic poles 6A, 6B so as to increase the cooling effect of the magnet 21 and the magnetic field winding 9. In the case where the magnets are arranged on one side of the rotating yoke, the alternator can be comparatively easily manufactured from the viewpoint of the number of magnets 21 being used and the selection of the protection cover 22.

Although the protection cover 22 in the second embodiment is cylindrical, the shape is not so limited and any member which is peripherally continuous may be used. For example, it is possible that the protection cover 22 may take the form of a binding-shaped wire and arranged on the outer periphery of the magnets 21 and the hook portions 8 of the hook-shaped magnetic poles 6A, 6B.

Figure 13:
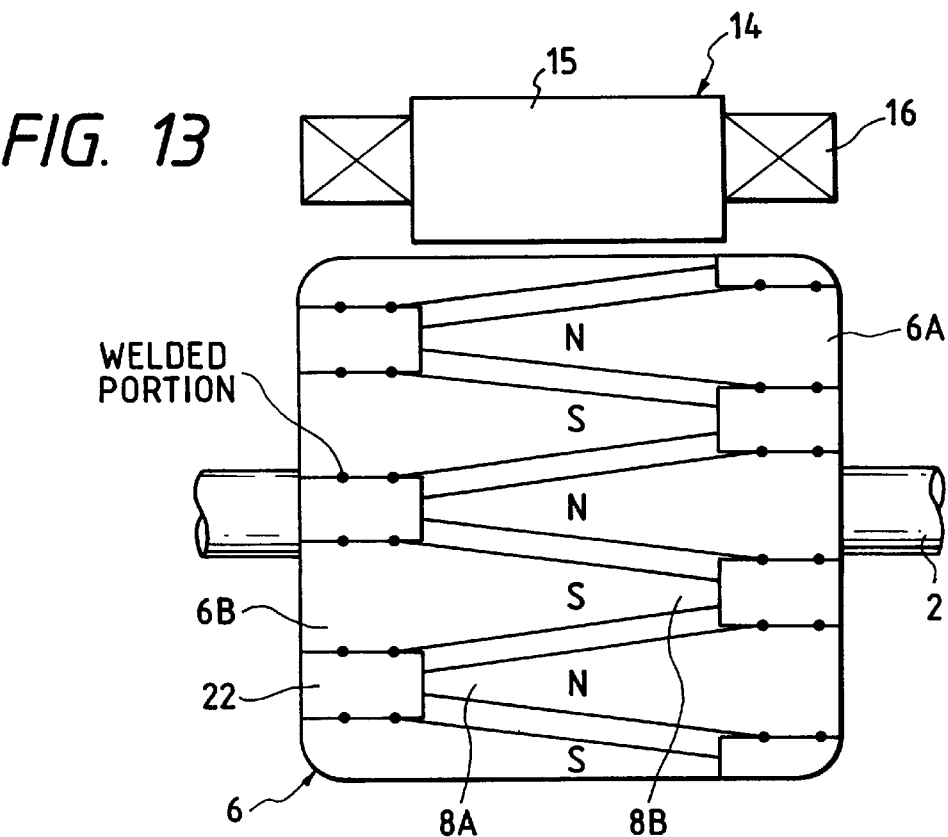
FIG. 13 is a front view showing a main part of another modified alternator representing the second embodiment in accordance with the present invention.
Figure 14:
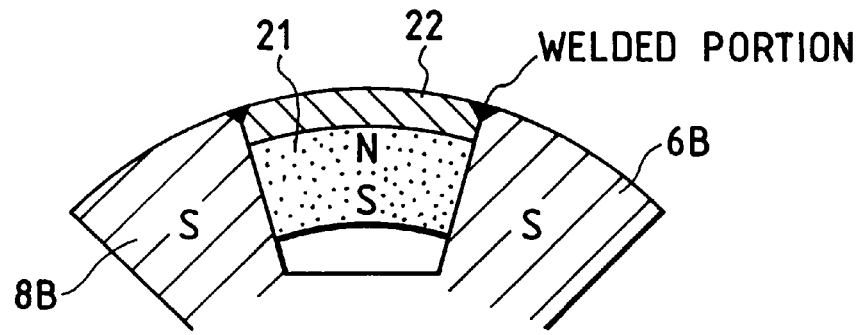
FIG. 14 is a partial cross-sectional view of the rotating yoke shown in FIG. 13.

It is possible that the protection cover 22 may be a segment-shaped member arranged only on the outer side of the magnets 21. In this case, as shown in FIG. 13 and FIG. 14, nearly cubic-shaped magnets 21 are arranged on at least one side of the rotation yoke 6 and between the adjacent hook portions 8 of the identical hook-shaped magnetic pole 6A or 6B, and the protection cover 22 is spot-welded and fixed to the side surface of the hook portion on the same side between the adjacent hook portions 8 of the identical hook-shaped magnetic poles 6A, 6B. In this case, since the protection cover can be spot-welded and fixed prior to assembling the hook-shaped magnetic poles 6A, 6B, there is an advantage in that the assembling of the protection cover 22 becomes easy.

A third embodiment according to the present invention will be described with reference to FIG. 15 to FIG. 17. In these figures like parts as in FIG. 1 to FIG. 5 are identified by the same reference characters. And, as for the same constructions and operations as in the first embodiment, description will be omitted.

Figure 15:
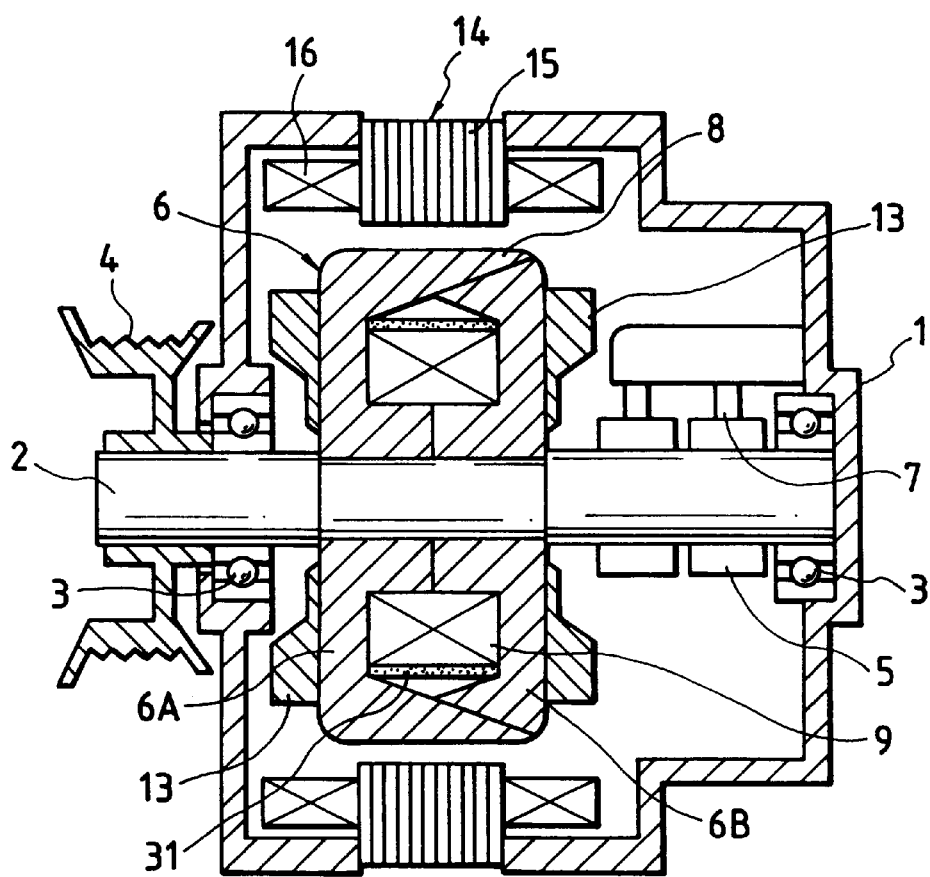
FIG. 15 is a partly cross-sectional vertical view showing a third embodiment of an alternator in accordance with the present invention.
Figure 16:
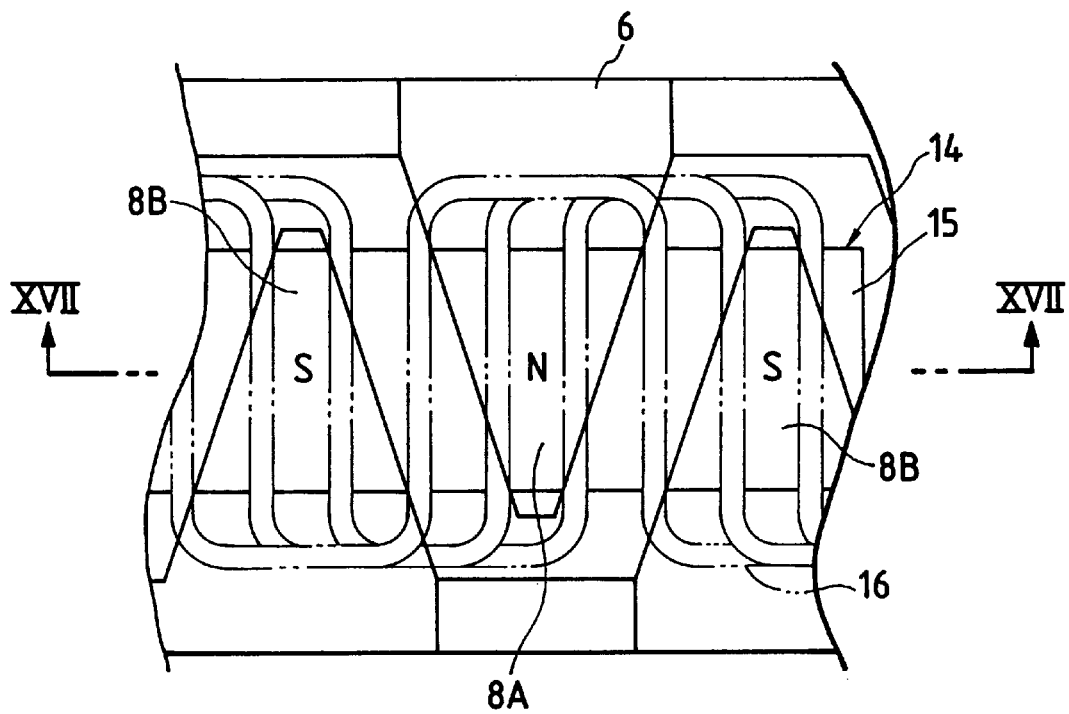
FIG. 16 is a top view showing the rotating yoke in the alternator shown in FIG. 15.
Figure 17:
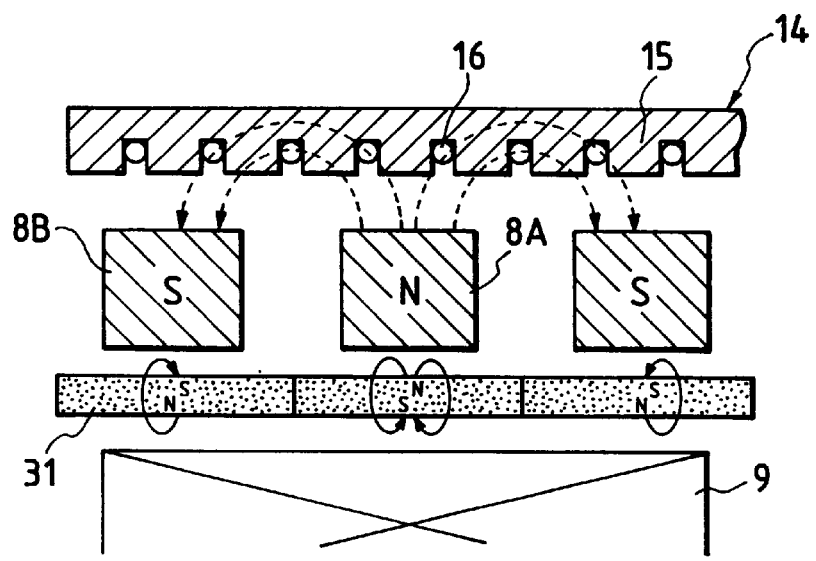
FIG. 17 is a cross-sectional view taken on the line XVII—XVII of FIG. 16.

In this embodiment of an alternator, as shown in FIG. 15 to FIG. 17, the magnet 31 is arranged between the hook portions 8 of the hook-shaped magnetic poles 6A, 6B in such a way as to face to the hook portion of the hook-shaped magnetic pole 6A or 6B having the same polarity as the polarity of the magnet 31.

As described above, the magnetic flux generated in the magnetic field winding 9 exits from the N-pole hook portion 8A of the hook-shaped magnetic pole 6A, and becomes the effective magnetic flux which intersects with the stator winding 16 wound in the stator magnetic pole 15 and the leakage magnetic flux which returns to the S-pole hook portion 8B of the hook-shaped magnetic pole 6B without passing through the stator magnetic pole 15. When the magnet 31 is arranged between the hook portions 8 of the hook-shaped magnetic poles 6A, 6B, the effective magnetic flux increases, and the magnetic resistance from the N-pole hook portion 8A of the hook-shaped magnetic pole 6A to the S-pole hook portion 8B of the hook-shaped magnetic pole 6B becomes large, since the magnetic path under the hook portions 8 of the hook-shaped magnetic poles 6A, 6B is eliminated and the area of the magnetic path is decreased. As the result, since the magnetic resistance of the path in which the effective magnetic flux passes equivalently becomes small, the leakage magnetic flux is decreased and the generating efficiency is increased. The magnet 31 generates a magnetomotive force in the hook-shaped magnetic poles 6A, 6B as an additional source of magnetomotive force in addition to the magnetic field winding 9 to increase the total amount of magnetic flux, which also increases the generating efficiency.

Since no magnet is arranged between the hook portions 8 of the hook-shaped magnetic poles 6A, 6B in this embodiment, there is no need to arrange the protection cover in this portion and the gap between the hook portion 8 of the hook-shaped magnetic poles 6A, 6B and the stator magnetic pole 15 is not increased, and therefore the magnetic resistance between the hook portion 8 of the hook-shaped magnetic poles 6A, 6B and the stator magnetic pole 15 is prevented from increasing. Since the magnet 31 is arranged between the hook portion 8 of the hook-shaped magnetic poles 6A, 6B and the magnetic field winding 9, fracturing and bursting-out of the magnets due to centrifugal force is prevented and lifting-up of the hook portions of the hook-shaped magnetic poles is prevented.

As described above, according to the third embodiment, the leakage magnetic flux between the hook portions 8 of the hook-shaped magnetic poles 6A, 6B is decreased and the total amount of the magnetic flux is increased, the magnetic resistance between the hook portions 8 of the hook-shaped magnetic poles 6A, 6B is prevented from increasing, and a higher generating efficiency can be attained. Fracturing and bursting-out of the magnet 31 due to centrifugal force is prevented, and the durability during high speed rotation is improved.

Although in the first embodiment to the third embodiment the magnets 11, 21, 31 are arranged in order to decrease the leakage magnetic flux between the hook portions 8 of the hook-shaped magnetic poles 6A, 6B and increase the total amount of magnetic flux, it is possible to use an antiferromagnetic material member or a super-conductive material member instead of a magnet.

Although in the first embodiment and the second embodiment the protection cover 12, 22 is spot-welded and fixed, it may be continuously welded with a laser beam. In this case, the joint strength and the productivity are increased.

According to the present invention, the leakage magnetic flux between the hook portions of the hook-shaped magnetic poles is decreased and the total amount of the magnetic flux is increased, the gap between the hook portions of the hook-shaped magnetic poles is prevented from increasing, and a higher generating efficiency can be attained.

Fracturing and bursting-out of the magnet due to centrifugal force is prevented, and the durability during high speed rotation can be improved.

What is claimed is:

1. A vehicle alternator, comprising:
   a rotatable shaft;
   a yoke, including a first series and a second series of hook-shaped magnetic poles, each hook-shaped magnetic pole including a hook portion having an outer end, each of said first series and said second series being made as a unitary body with said first series and said second series arranged facing each other and mounted concentrically on said rotatable shaft for rotation therewith, with a part of each hook portion of said first series intermediate parts of two hook portions of said second series and with a part of each hook portion of said second series intermediate parts of two hook portions of said first series, and with first spaces defined between each two adjacent hook portions of said first series and adjacent the outer end of a hook portion of said second series intermediate said two adjacent hook portions of said first series, and second spaces defined between each two adjacent hook portions of said second series and adjacent the outer end of a hook portion of said first series intermediate said two adjacent hook portions of said second series;
   a field winding for generating a magnetic field in said first series and said second series of hook-shaped magnetic poles, the magnetic field having a first polarity in said first series and a second, opposite polarity in said second series;
   stator magnetic poles arranged around the periphery of said yoke and spaced therefrom by a preset gap;
   a plurality of leakage magnetic flux decreasing members fitted in the defined spaces, each leakage magnetic flux decreasing member having the same polarity as its two adjacent hook portions of the same series and directly contacting side walls of said two adjacent hook portions of the same series, the radially outer width of each leakage magnetic flux decreasing member being greater than the radially inner width of such leakage magnetic flux decreasing member; and a plurality of non-magnetic metal cover plates, each plate being disposed over the radially outer surface of an associated one of said leakage magnetic flux decreasing members and welded to said two adjacent hook portions of the same series to cause the outer periphery of said cover plates to be substantially even with the outer periphery of said hook portions.

2. A vehicle alternator according to claim 1, wherein said protection cover is made of stainless steel.

3. A vehicle alternator according to claim 1, wherein said protective cover is made of titanium.

4. A vehicle alternator, comprising:

a rotatable shaft;

a yoke, including a first series and a second series of hook-shaped magnetic poles, each hook-shaped magnetic pole including a hook portion, each of said first series and said second series being made as a unitary body with said first series and said second series arranged facing each other and mounted concentrically on said rotatable shaft for rotation therewith, with each hook portion of said first series intermediate two hook portions of said second series and each hook portion of said second series intermediate two hook portions of said first series, and with spaces defined between each two adjacent hook portions;

a field winding for generating a magnetic field in said first series and said second series of hook-shaped magnetic poles, the magnetic field having a first polarity in said first series and a second, opposite polarity in said second series;

stator magnetic poles arranged around the periphery of said yoke and spaced therefrom by a preset gap;

a plurality of leakage magnetic flux decreasing members fitted in the defined spaces, each leakage magnetic flux decreasing member directly contacting side walls of the two adjacent hook portions, the radially outer width of each leakage magnetic flux decreasing member being greater than the radially inner width of such leakage magnetic flux decreasing member; and a plurality of non-magnetic metal cover plates, each plate being disposed over the radially outer surface of an associated one of said leakage magnetic flux decreasing members and welded to said two adjacent hook portions to cause the outer periphery of said cover plates to be substantially even with the outer periphery of said hook portions.

5. A vehicle alternator according to claim 4, wherein said protection cover is made of stainless steel.

6. A vehicle alternator according to claim 4, wherein said protective cover is made of titanium.

* * * * *